(12) United States Patent
Shannon et al.

(10) Patent No.: US 8,820,532 B2
(45) Date of Patent: Sep. 2, 2014

(54) LEAK-PROOF PACKAGING FOR WET BATTERIES

(75) Inventors: John K. Shannon, Milwaukee, WI (US); Michael F. Emery, Oak Creek, WI (US); Robert B. Hoganson, Kenosha, WI (US)

(73) Assignee: Quick Cable Corporation, Franksville, WI (US)

( * ) Notice: Subject to any disclaimer, the term of this patent is extended or adjusted under 35 U.S.C. 154(b) by 0 days.

(21) Appl. No.: 13/441,137

(22) Filed: Apr. 6, 2012

(65) Prior Publication Data

US 2013/0266848 A1   Oct. 10, 2013

(51) Int. Cl.
| | |
|---|---|
| B65D 85/00 | (2006.01) |
| B65D 85/24 | (2006.01) |
| B65B 5/00 | (2006.01) |
| H01M 2/02 | (2006.01) |
| B65D 53/00 | (2006.01) |
| H01M 2/10 | (2006.01) |

(52) U.S. Cl.
CPC H01M 2/02 (2013.01); *Y02E 60/12* (2013.01); B65D 53/00 (2013.01); H01M 2/1094 (2013.01)
USPC .............................. 206/705; 53/467; 206/204

(58) Field of Classification Search
USPC .................. 206/204, 703–705; 229/147, 148; 588/249–260; 429/175, 176; 53/467
See application file for complete search history.

(56) References Cited

U.S. PATENT DOCUMENTS

| | | |
|---|---|---|
| 1,936,951 A | 11/1933 | Peterson |
| 4,813,207 A | 3/1989 | Rundle |
| 4,966,280 A | 10/1990 | Bradford |
| 5,160,025 A | 11/1992 | Greenawald |
| 5,226,555 A | 7/1993 | Kovaleski |
| 5,248,547 A | 9/1993 | Wilson |
| 5,427,238 A | 6/1995 | Weiss |
| 5,441,170 A | 8/1995 | Bane, III |
| 5,615,795 A | 4/1997 | Tipps |
| 5,651,821 A * | 7/1997 | Uchida .......................... 206/703 |
| 5,709,068 A | 1/1998 | Bylenga |
| 5,833,057 A * | 11/1998 | Char et al. .................... 206/204 |
| 5,860,555 A * | 1/1999 | Mayled .......................... 229/148 |
| 5,878,948 A | 3/1999 | Schultz et al. |
| RE36,412 E | 11/1999 | Jones |
| 6,015,084 A | 1/2000 | Mathieu et al. |
| 6,308,728 B1 * | 10/2001 | Frazier ............................ 141/86 |

(Continued)

OTHER PUBLICATIONS

"Shipping Batteries Safely: What you Need to Know". Date: Unknown. 4 pages.

(Continued)

*Primary Examiner* — Bryon Gehman
(74) *Attorney, Agent, or Firm* — Jansson Munger McKinley & Shape Ltd.

(57) ABSTRACT

A leak-proof package for at least one defective battery containing corrosive liquid. The inventive package has at least three layers and includes an inner container configured to accept the battery therewithin, a fluid-impermeable intermediate container sealing the inner container therewithin, and an outer container enclosing the intermediate container such that the liquid-containing defective battery is protectively packaged for leak-free transportation. Another aspect of the present invention is a method for packaging at least one battery containing corrosive liquid by loading the battery into the inner container which is sealed within the intermediate container inside the locked outer container such that the liquid-containing defective battery is protectively packaged for leak-free transportation.

43 Claims, 12 Drawing Sheets

(56) References Cited

U.S. PATENT DOCUMENTS

| | | | |
|---|---|---|---|
| 6,347,498 B1 | 2/2002 | Pienta et al. | |
| 7,063,212 B2 * | 6/2006 | Ordonez | 206/703 |
| 7,494,014 B2 * | 2/2009 | Martinez | 206/705 |
| 7,749,648 B2 * | 7/2010 | Kim | 429/175 |
| 7,752,827 B2 | 7/2010 | Learn et al. | |

OTHER PUBLICATIONS

ICC Compliance Center. PK-Battery 2 Packaging Instructions. Date: Unknown. 1 page.

Federal Register. Department of Transportation. Date: Jan. 14, 2009. 72 pages.

UPS brochure. "How to Safely Pack and Ship Batteries". Date: Jan. 3, 2011. 8 pages.

FedEx Express brochure. "Packaging Guidelines for Battery Shipments". Date: Nov. 2009. 5 pages.

Letter from Hattie L. Mitchell, Chief, Regulatory Review and Reinvention, Office of Hazardous Materials Standards, U.S. Department of Transportation regarding description for electric storage battery on a shipping paper. Date: Jan. 16, 2009. 3 pages.

Excerpts from Recycling Magazine. "Transporting used batteries: It's not quite that simple". www.recyclingmagaizn.de. Copyright 2011. 3 pages.

Excerpts from Airpack. "Hazmat Packaging". www.airpack.com. Date: Copyright 2009. 2 pages.

Government of Alberta. Dangerous Goods and Rail Safety brochure. "Transportation of Batteries and Battery Fluids by Road". Date: Sep. 2010. 13 pages.

Delphi Energy and Chassis Systems. MSDS for Dehpi BU-31SP-115S Battery. Date: Jan. 1, 1985. 9 pages.

The Battery Broker Environmental Services Inc. "The Battery Broker Shipping Guidelines Small Package Battery Shipments". www.batterybroker.on.ca. Date: Mar. 2, 2006. 5 pages.

East Penn Manufacturing Co., Inc. Excerpt of Material Safety Data Sheet. Lead Acid Battery Wet, Filled with Acid. Date: Unknown. 1 page.

Crown Battery Mfg. Company. Excerpt of Material Safety Data Sheet. Lead Acid-Acid Batteries, Wet, Filled with Acid-UN 2794. Date: Dec. 1, 2009. 5 pages.

Packing instructions for PK-Battery Box. 1 page. Date: May 19, 2006.

LabelMaster. www.labelmaster.com. Hazmat Packaging. 1 page. Date: Copyright 2014.

Assembly instructions w4GV-16. 2 pages. Date: Unknown.

* cited by examiner

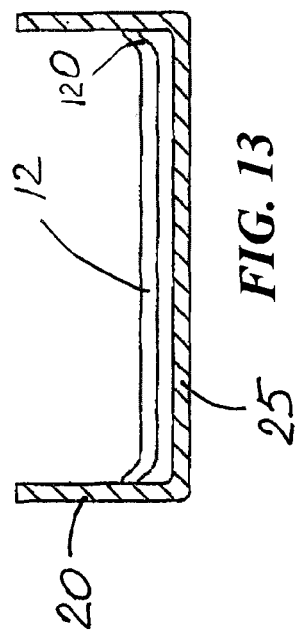
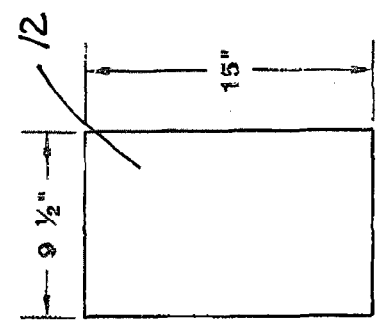
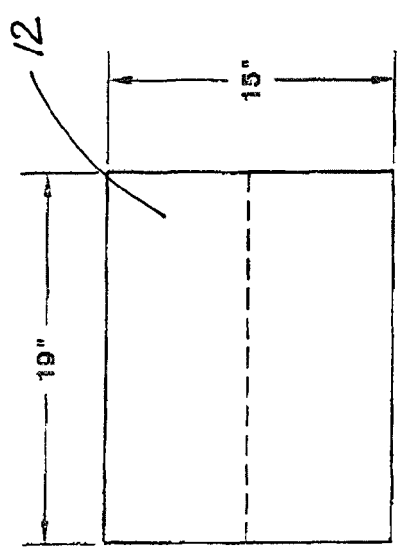
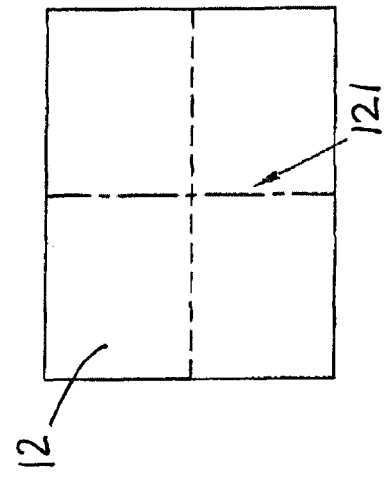
FIG. 13
FIG. 12
FIG. 10
FIG. 11

Item Name: Yellow HazMat SingleWeight SonicBonded Pads

Absorbency
- 31.1 gal./package (117.7 L/package)
- 19.9 oz./pad (588.4 mL/pad)

Amount: 200 pads/package

| Product Dimensions | | | | | |
|---|---|---|---|---|---|
| Length | Width | Height | Depth | Int. Dia. | Ext. Dia. |
| 19" (48.3 cm) | 15" (38.1 cm) | — | — | — | — |

| Shipping Dimensions | | | |
|---|---|---|---|
| Length | Width | Height | Cube |
| 19" (48.3 cm) | 15" (38.1 cm) | 17" (43.2 cm) | 2.8' (85.3 cm) |

Weight: 14.7(6.7 kg)

Color: Yellow

Per Pallet: 30

Features and Benefits

- The Power of HazMat/When hazardous or unknown liquids spill, use HazMat Sorbent Products for quick, efficient response. 100% polypropylene absorbs most aggressive or caustic fluids. All HazMat Sorbents are color-coded in Safety Yellow for quick identification

- Fast-Acting for Quick Response/A layer of MeltBlown polypropylene creates high surface area that enables SonicBonded Mat to quickly soak up liquids.

- High Absorbency Keeps It on the Job Longer/A random assembly of large diameter MeltBlown poly fibers creates a lofty layer.

- Ultrasonic Bond Points Keep Mat Intact/Ultrasonic bond points fuse layers of fibers together - Mat keeps its shape even when completely saturated. Top layer of SpunBond fabric provides added strength.

- Perforations Save Money/SpunBond top layer allows for better-defined perforations and cleaner, easier tear-offs. Rolls are perfed every 7.5" vertically and 17" horizontally. Pads are perfed vertically at 7.5".

- Helps You comply/29 CFR 1910.22(a)(2), 29 CFR 1910.107(b)(3), 29 CFR 1910.107(g)(2), 29 CFR 1910.120(j)(1) and 29 CFR 910.1450(e).

*FIG. 14*

LEAK-PROOF PACKAGING FOR WET BATTERIES

FIELD OF THE INVENTION

This invention related generally to packaging for transportation of hazardous goods and, more particularly, to packaging of damaged or leaking batteries filled with corrosive liquids such as lead acid.

BACKGROUND OF THE INVENTION

Various types of batteries are everywhere in the modern life. And, most batteries are considered hazardous materials (also called dangerous goods). Some batteries contain corrosive liquid, which can injure people or damage property. If not properly packaged, shipments of such batteries may cause a variety of problems during transport. In addition, failure to comply with the regulations or packaging requirements may result in a fine or even jail time.

Most common example of such batteries are charged wet batteries or wet cell batteries which are typically filled with corrosive acid or alkali and are regulated for shipments as Class 8—corrosive. Wet batteries are common in vehicles, utility systems, un-interruptible power systems and industrial machinery. These commodities must be correctly identified, classified, packaged, marked and labeled. UN numbers provide proper shipping names for wet batteries and include UN 2794 for wet batteries used for electric storage and filled with acid, UN 2800 for wet batteries used for electric storage, UN 2795 for wet batteries used for electric storage and filled with alkali, and UN 2800 for nonspillable wet batteries.

Shipments of such batteries are subject to regulations issued by the U.S. Department of Transportation (DOT), and International Civil Aviation Organization (ICAO). These regulations are devised to ensure the safe transportation of hazardous materials—including batteries—shipped by highway, rail, water, or air. Presently, the batteries should be packaged and tested according to 49 CFR 173.159 for U.S. shipments, or IATA Section 5, Packing Instruction 870 (2011 edition).

Various carriers such as FedEx, DHL, or UPS, provide special packaging for wet batteries and require their customers to comply with the regulations. General wet-battery packaging guidelines include packaging of wet cell batteries in containers which include metal containers, with acid/alkali leakproof liner—sealed to prevent leakage. Batteries are required to be placed into a sturdy outer container and be securely fastened with fill openings and vents facing up to prevent short-circuiting or overheating. All terminals must be protected against short circuit.

While many carriers provide packaging which generally follows the guidelines, such packaging is typically not suitable for shipping of damaged leaking batteries. Packaging which is available for damaged batteries, often has an irregular shape such as round plastic buckets or barrels which take much extra space along other packages which are mostly rectangular. Moreover, available packaging is typically fully sealed with adhesive or adhesive tape which requires at least partial breakage of the packaging in the event of a need to open the package for inspection prior to the package reaching its destination. In such event, the package has to be reassembled which requires additional supplies that may not be available at the inspection site.

It would be desirable to have leak-proof packaging that is suitable for transporting damaged or leaking wet batteries and which overcomes problems referred to above.

OBJECTS OF THE INVENTION

It is an object of the invention to provide an improved leak-proof packaging for damaged or leaking batteries, such packaging overcoming some of the problems and shortcomings of the prior art, including those referred to above.

Another object of the invention is to provide a leak-proof packaging which is simple in assembly and leak-proof packing of damaged or leaking batteries for safe transportation.

Another object of the invention is to provide a leak-proof packaging which substantially eliminates the possibility for erroneous assembly to substantially avoid improper packaging of damaged or leaking batteries.

Still another object of the invention is to provide an improved leak-proof packaging which allows easy access to the packaged batteries for inspection during transportation.

Yet another object of the present invention is to provide an improved leak-proof packaging which allows re-closing free of additional supplies.

How these and other objects are accomplished will become apparent from the following descriptions and the drawings.

SUMMARY OF THE INVENTION

The present invention provides an improved protective leak-proof packaging designed for safe transportation of defective or old batteries containing corrosive liquids such as lead acid.

The inventive package has at least three layers and includes an inner container configured to accept the battery therewithin, a fluid-impermeable intermediate container sealing the inner container therewithin, and an outer container enclosing the intermediate container.

The inner container is preferably formed by an inner-container surrounding wall which includes an inner-container topwall. The inner container topwall forms an inner-container closure of an inner-container access opening. The inner container is preferably made of an absorbent material. It is preferred that the package includes at least one absorbent pad along an inner-container bottomwall.

It is preferred that the fluid-impermeable intermediate container be a plastic bag which has a top end forming a fluid-impermeable lock. The fluid-impermeable lock preferably has an interlocking groove and ridge which form a fluid-tight seal when engaged together. The intermediate-container bag is protected from puncture by being between the inner and outer containers, i.e., the inner container protects the bag from being punctured by the battery and the outer container protects the bag from exterior elements.

The outer container is preferably formed by an outer-container surrounding wall which includes an outer-container topwall. The outer-container topwall forms an outer-container closure of an outer-container access opening.

It is preferred that the inner container is of a cushioning material and the outer container is of a substantially stiff material. The inner and outer containers are each preferably made of corrugated cardboard.

In preferred embodiments, the inner container is made of a sheet material which is folded and erected to form a substantially rectangular box which has the inner-container surrounding wall. The inner-container surrounding wall includes an inner-container bottomwall and an inner-container sidewall which extends from the bottomwall. The inner-container topwall is connected to the inner-container sidewall.

The inner-container surrounding wall is preferably substantially free of three-way-corner sidewall junctions with the inner-container topwall and with the inner-container bottomwall. The sheet forming the inner container is preferably cut at positions adjacent to the three-way junctions to remove what otherwise be pointed corners. In other words, the corners of the inner container are preferably cut off to minimize puncturing of the intermediate plastic bag which envelopes the inner container.

The outer container is made of a sheet folded and erected to form a substantially rectangular box protecting the intermediate bag from puncture by external elements. The outer-container surrounding wall includes an outer-container bottomwall and an outer-container sidewall which extendes from the outer-container bottomwall. The outer-container topwall is connected to the outer-container sidewall.

The closures of the inner, outer and intermediate containers are preferably re-closeable permitting repeated opening and closing of the leak-proof package. The inner and outer-container closures and the fluid-impermeable lock are preferably adhesive-free.

The inner-container closure is preferably formed by overlapping inner-container topwall flaps each extending from a corresponding portion of the inner-container sidewall. It is preferred that the outer-container closure includes a locking tab which is integral with and extends from the outer-container sidewall. The outer-container closure preferably includes a major flap which extends from a first portion of the outer-container sidewall. The major flap overlaps a pair of minor flaps each of which extends from one of second and third portions of the outer-container sidewall and is adjacent to a fourth portion. The major flap preferably terminates with a transverse interior flange which defines an aperture therethrough. The locking tab preferably extends from a fourth portion of the outer-container sidewall opposite the first outer-sidewall portion and through the flange aperture to hold the flange against an interior surface of the fourth outer-sidewall portion.

In preferred embodiments, the package further includes a fluid-impermeable innermost container which is configured to seal the battery therewithin and has a top end forming a fluid-impermeable lock. It is preferred that the innermost container be a plastic bag and the fluid-impermeable lock include an interlocking groove and ridge that form a fluid-tight seal when engaged together.

The package preferably further includes an inner spacer for positioning over the battery to limit battery movement. The inner spacer is preferably of a cushioning material. It is also preferred that a plurality of buffers be positioned between the intermediate container and the outer-container surrounding wall.

Another aspect of the present invention is a method for packaging at least one battery containing corrosive liquid. In the inventive method, the inner container is enveloped with the fluid-impermeable intermediate container which has the fluid-impermeable lock at its top end. The inventive packaging is further assembled by putting the intermediate container into the outer container. The battery is loaded into the inner container and the access opening of the inner container is closed with the battery within the inner container. The fluid-impermeable lock of the intermediate container is then sealed with the inner container being inside the intermediate container. The packaging of the battery is completed by locking the access opening of the outer container with the battery being inside the inner container which is sealed inside the intermediate container inside the locked outer container such that the liquid-containing defective battery is protectively packaged for leak-free transportation.

It is preferred that the battery is loaded into the inner container after the inner container is enveloped by the intermediate container. It is also preferred that intermediate container which envelopes the inner container is put inside the outer container prior to loading the battery into the inner container. The inner and outer containers protect the bag from puncture by the battery and external elements, respectively.

In preferred embodiments, the fluid-impermeable lock of the intermediate container is sealed by engaging the interlocking groove and ridge of the fluid-impermeable lock which forms the fluid-tight seal.

It is preferred that at least one absorbent pad be positioned along an inner-container bottomwall before the battery is loaded into the inner container.

An inner spacer is preferably placed over the battery to limit battery movement. It is also preferred that a plurality of buffers are inserted inside the outer container, each buffer being between the intermediate container and the outer surrounding wall.

In preferred embodiments of the inventive method, prior to loading the battery into the inner container, the battery is preferably inserted into the fluid-impermeable innermost container which has a top end forming a fluid-impermeable lock. Prior to the battery being inserted into the innermost container, the innermost container is preferably placed inside the inner container. The innermost container is preferably a plastic bag with the fluid-impermeable lock including an interlocking groove and ridge which form the fluid-tight seal when engaged together. The fluid-impermeable innermost container is sealed with the battery therewithin.

BRIEF DESCRIPTION OF THE DRAWINGS

FIG. 10 is a plan view of an absorbent pad and showing exemplary length and width of the pad.

FIG. 11 is another plan view of the absorbent pad of FIG. 10 and showing an exemplary fold line of the pad.

FIG. 12 is a plan view of the absorbent pad of FIG. 10 being folded and showing the length and width of the folded pad.

FIG. 13 is a fragmentary cross-sectional view of a bottom portion of the inner container and illustrating positioning of the absorbent therein.

FIG. 14 is a specification sheet of an exemplary material for absorbent pad of FIGS. 10-13.

DETAILED DESCRIPTION OF EXEMPLARY EMBODIMENTS

FIGS. 1-14 illustrate an improved protective leak-proof packaging 10 designed for safe transportation of defective or old batteries 11 containing corrosive liquids such as lead acid.

Figure 1:
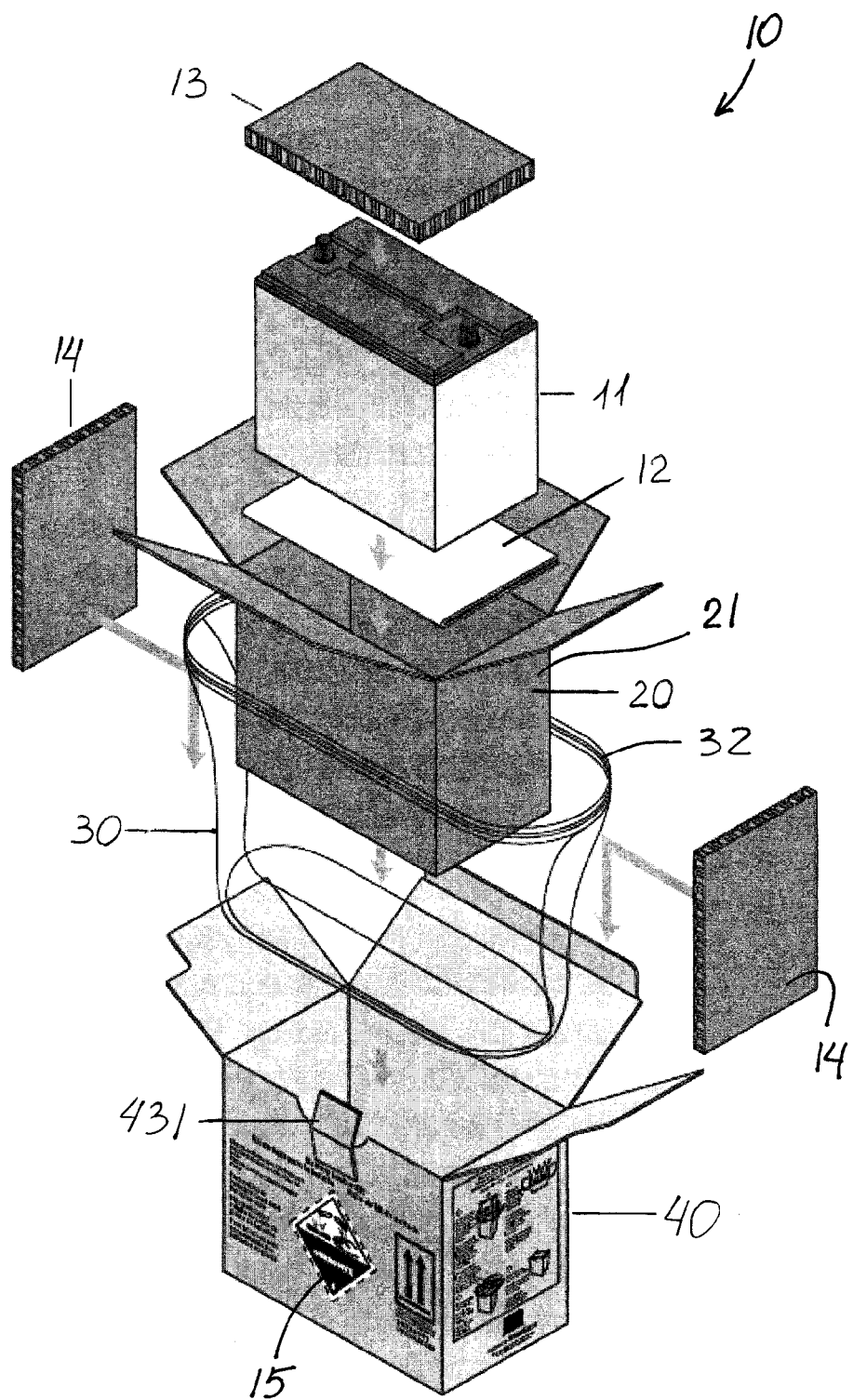
FIG. 1 is an exploded perspective view of a leak-proof packaging of the present invention.

FIG. 1 illustrates package as having three layers enclosing battery 11. The three layers include an inner container 20 configured to accept battery 11 therewithin, a fluid-impermeable intermediate container 30 sealing inner container 20 therewithin, and an outer container 40 enclosing intermediate container 30.

Figure 2:
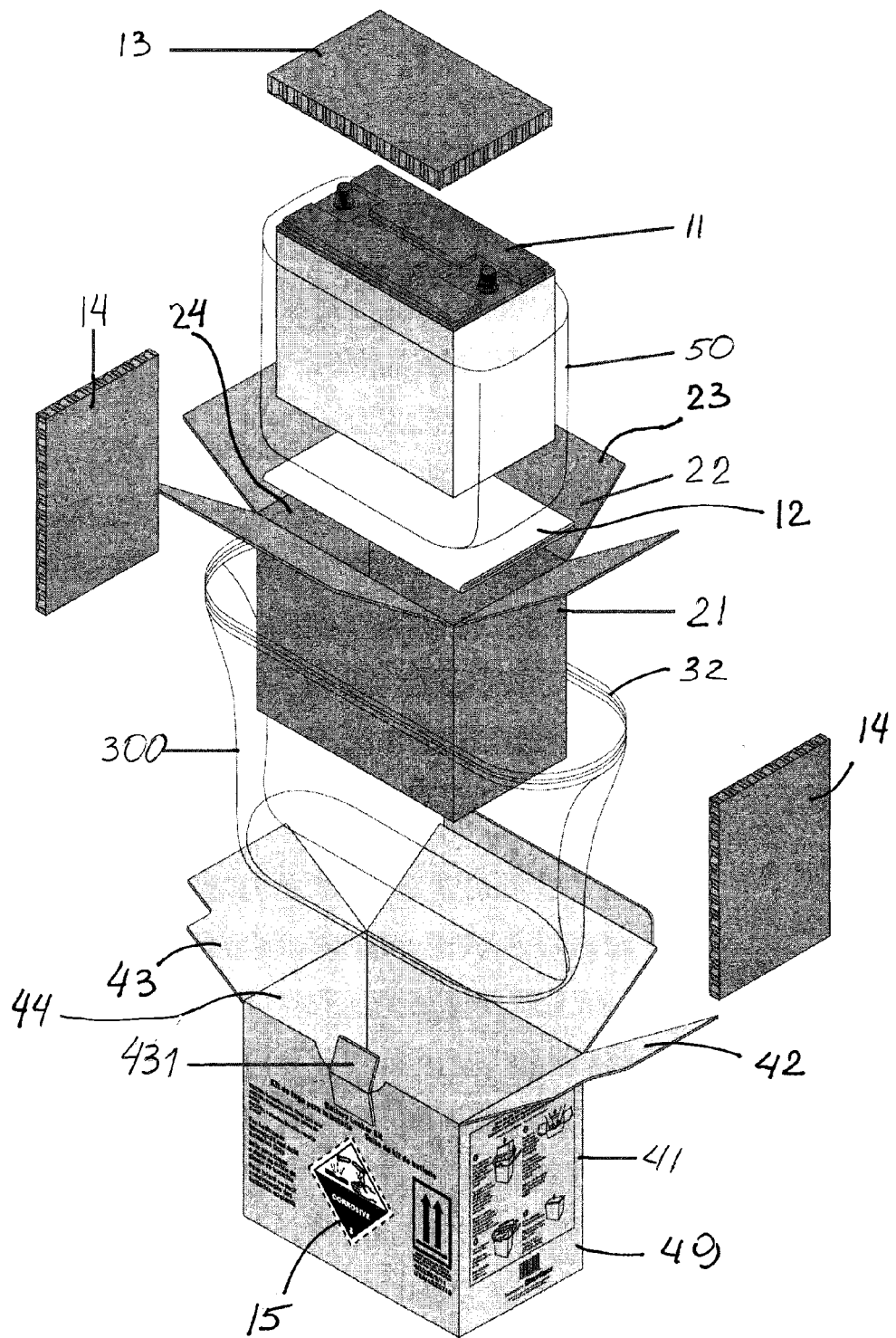
FIG. 2 is an exploded perspective view of another embodiment of the leak-proof packaging of the present invention including a second fluid-impermeable container.
Figure 3:
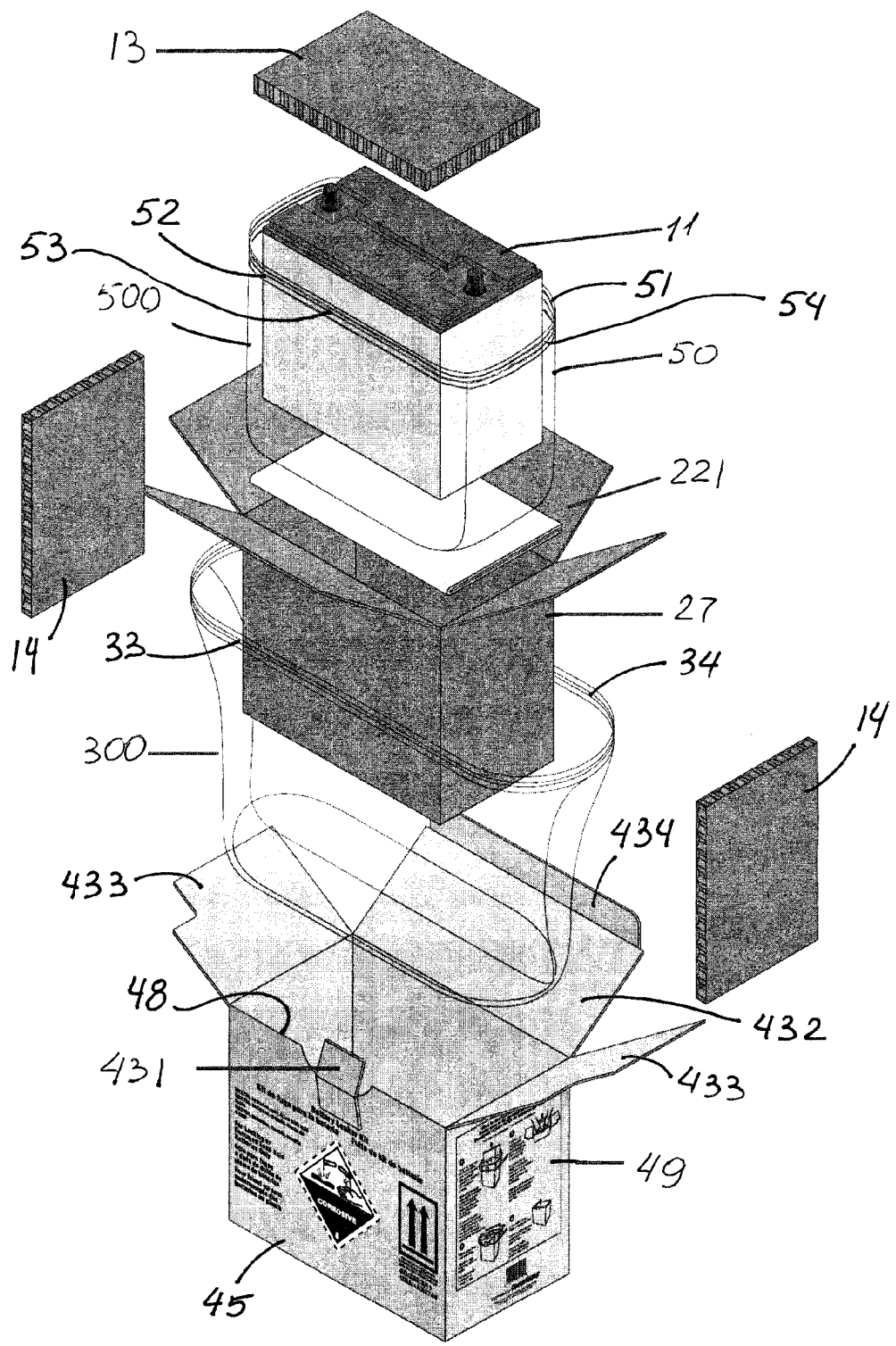
FIG. 3 is an exploded perspective view of yet another embodiment of the leak-proof packaging of the present invention with the second fluid-impermeable container having a hermetic seal.

It is seen in FIGS. 1-3 that inner container 20 is formed by an inner-container surrounding wall 21 which includes an inner-container topwall 22. Inner container topwall 22 forms an inner-container closure 23 of an inner-container access opening 24.

It is further seen in FIGS. 10-13 that package 10 includes an absorbent pad 12 along an inner-container bottomwall 25 with edges 120 of pad 12 being turned up, as best seen in FIG. 13. FIGS. 10-13 illustrate the formation and dimensions of absorbent pad. FIG. 10 shows pad 12 being unfolded. It is preferred that at lest two pieces of pad material be positioned together for greater absorbency. Shows a fold line 121 along which pad 12 is folded for double thickness, as seen in FIG. 12. FIG. 14 includes some specifications regarding an exemplary material of absorbent pad 12.

Figure 15:
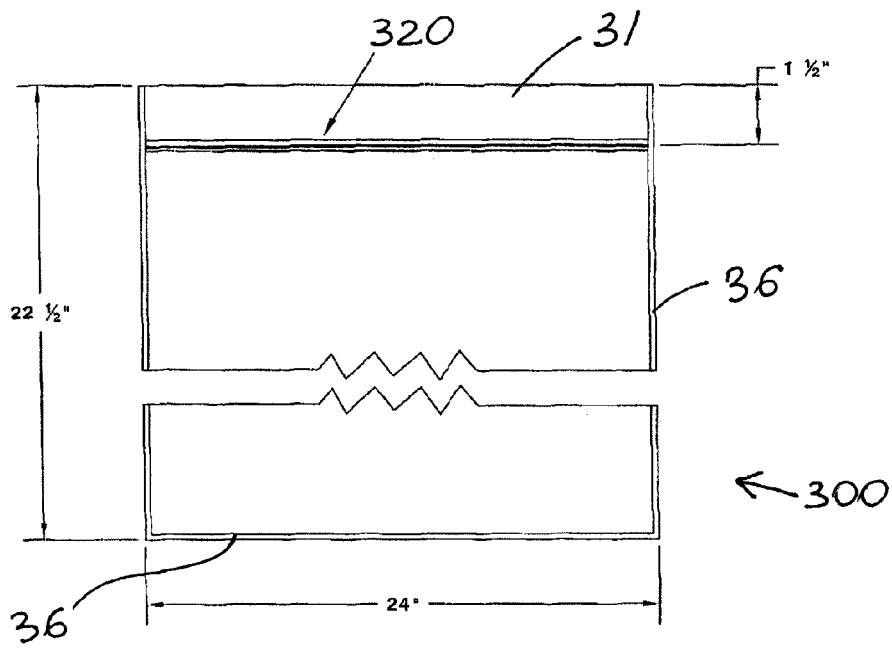
FIG. 15 is a plan view of a plastic bag and showing exemplary dimensions thereof.
Figure 16:
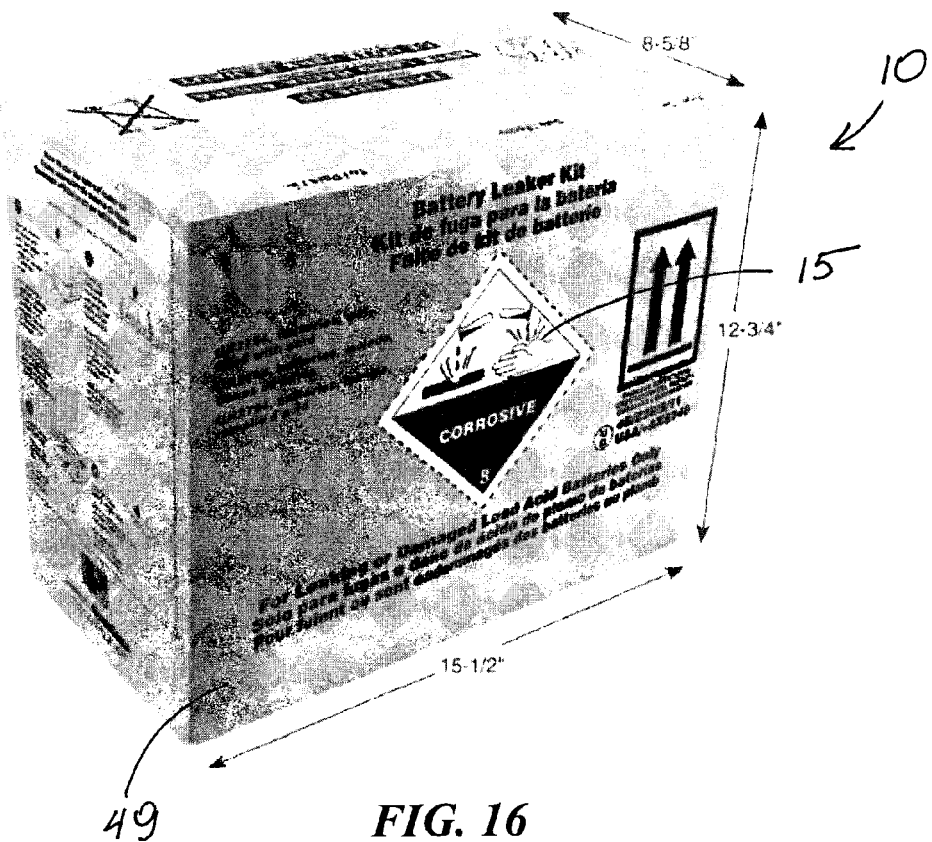
FIG. 16 is a perspective view of the assembled and closed the leak-proof packaging of the present invention.

FIGS. 1-3 and 15 show fluid-impermeable intermediate container 30 as a plastic bag 300. Bag 300 may be 24 inches wide and 22½ inches long with 1½ inches lip over lock 32, as best seen in FIG. 15. One exemplary material for bag 300 is a nylon/PE film which may generally be referred to as a 6 mil poly bag and also be described as 98 gauge nylon/4.0 mil polyethylene or bi-oriented nylon over 4 mil linear low-density polyethlene. Such Nylon/PE film is more puncture and tear resistant than another exemplary material which may be referred to as LLDPE film. Other acid resistant materials may also be used for making bag 300 of intermediate container 30. Bag 300 may have thin welded edges or heat-sealed edges 36 which are about ¼ inch wide and provide greater structural stability and reliability of bag 300 than thin welded edges. Such seal edges 36 are straight and without gaps. And, the bag material is preferably free from nicks, pinholes and carbon deposits, each of which may diminish acid-impermeability of bag 300. It is seen in FIGS. 1-3 that intermediate-container bag 30 is protected from puncture by being between inner and outer containers 20 and 40 such that inner container 20 protects bag 300 from being punctured by battery 11 and outer container 40 protects bag 300 from exterior elements.

As further seen in FIGS. 1-3 and 15, bag 300 has a top end 31 forming a fluid-impermeable lock 32. Fluid-impermeable lock 32 has an interlocking groove 33 and ridge 34 which form a fluid-tight seal when engaged together. Such lock 32 may also be referred to as a hermetic or no-leak zipper 320 and described as a PTC zipper & closure. Zipper 320 may also include a "slider" to assist the user in sealing bag 300.

FIGS. 1-3 further illustrate that outer container 40 is formed by an outer-container surrounding wall 41 which includes an outer-container topwall 42. Outer-container topwall 42 forms an outer-container closure 43 of an outer-container access opening 44.

Inner and outer containers 20 and 40 are each preferably made of corrugated cardboard which provides cushioning and absorbing characteristics for inner container 20 and the stiffness for outer container 40.

Figure 4:
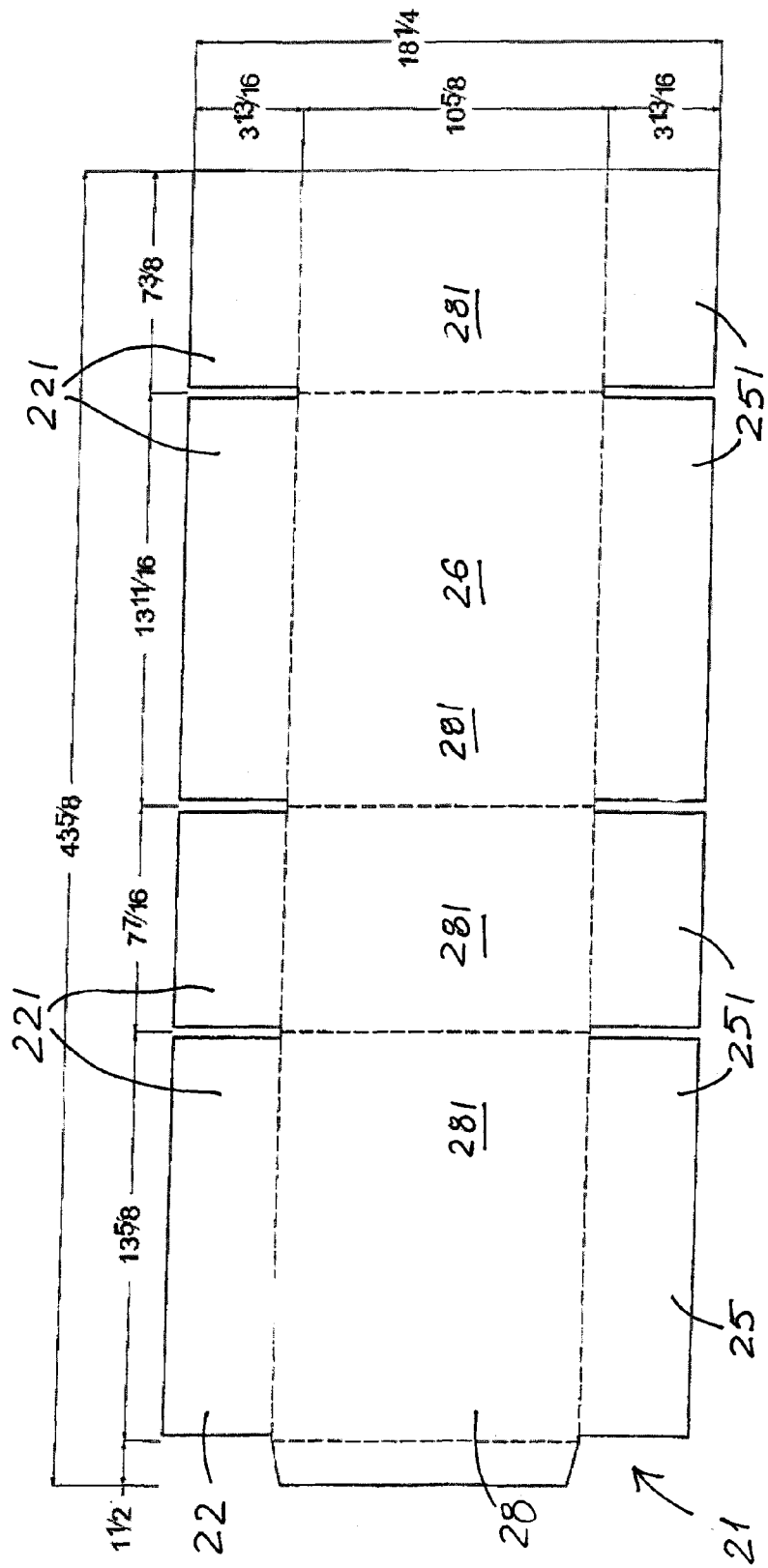
FIG. 4 is a plan view of a sheet material cut for an inner container.

FIG. 4 illustrates a sheet 26 of material which is cut for inner-container surrounding wall 21 and which is folded and erected into a rectangular box 27 forming inner container 20. It is seen in FIG. 4 that inner-container surrounding wall 21 includes inner-container bottomwall 25 and an inner-container sidewall 28 which extends from bottomwall 25. As seen in FIG. 4, inner-container topwall 22 is connected to inner-container sidewall 28. It is also seen in FIG. 4 that inner-container bottomwall 25 is formed by four overlapping flaps 251 which provide additional absorbent layers.

Figure 18:
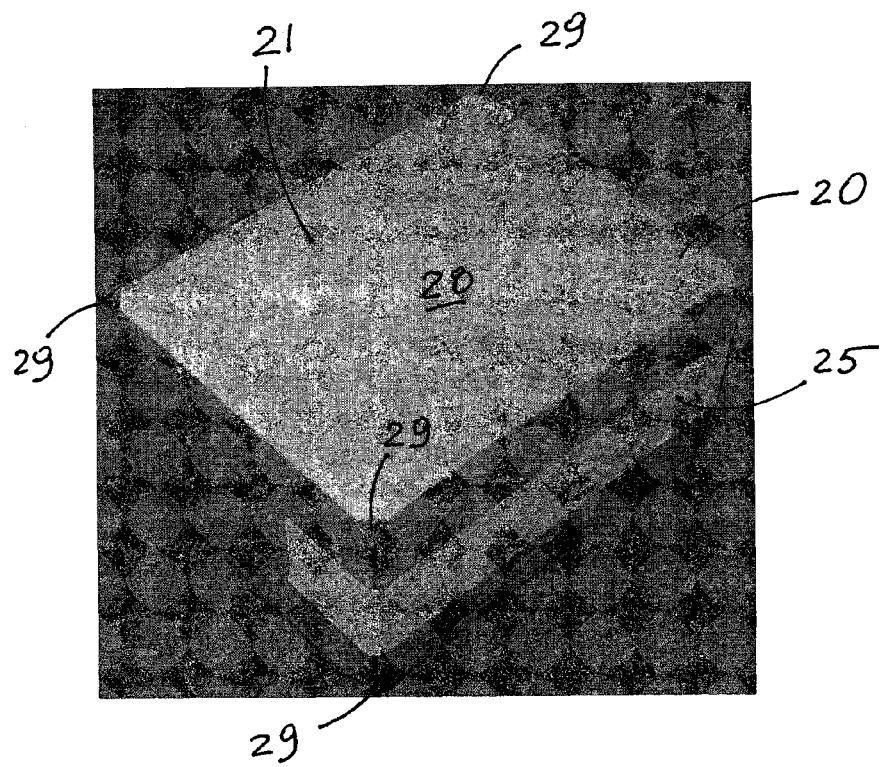
FIG. 18 is a perspective view of the inner container showing cut corners minimizing puncturing of the intermediate-container bag.
Figure 19:
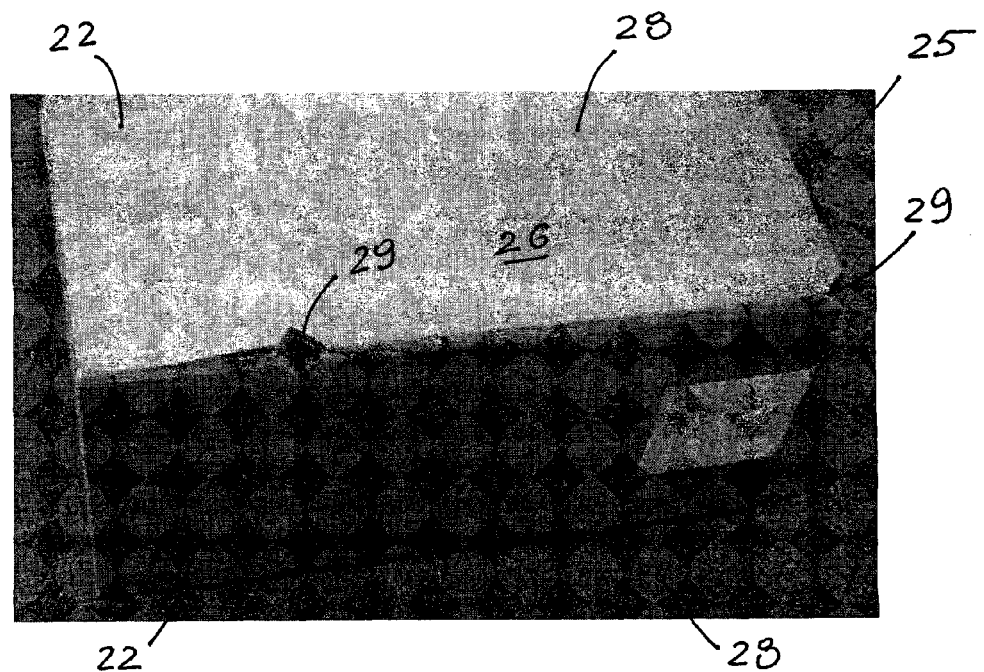
FIG. 19 is a fragmentary perspective view of the inner container of FIG. 18.

FIGS. 18 and 19 show inner-container surrounding wall 21 free of three-way-corner sidewall junctions 29 with inner-container topwall 22 and with inner-container bottomwall 25. As best seen in FIG. 19, sheet 26 forming inner container 20 is cut at positions adjacent to three-way junctions 29 to remove what otherwise be pointed corners to minimize puncturing of intermediate-container plastic bag 300 which envelopes inner container 20.

Figure 5:
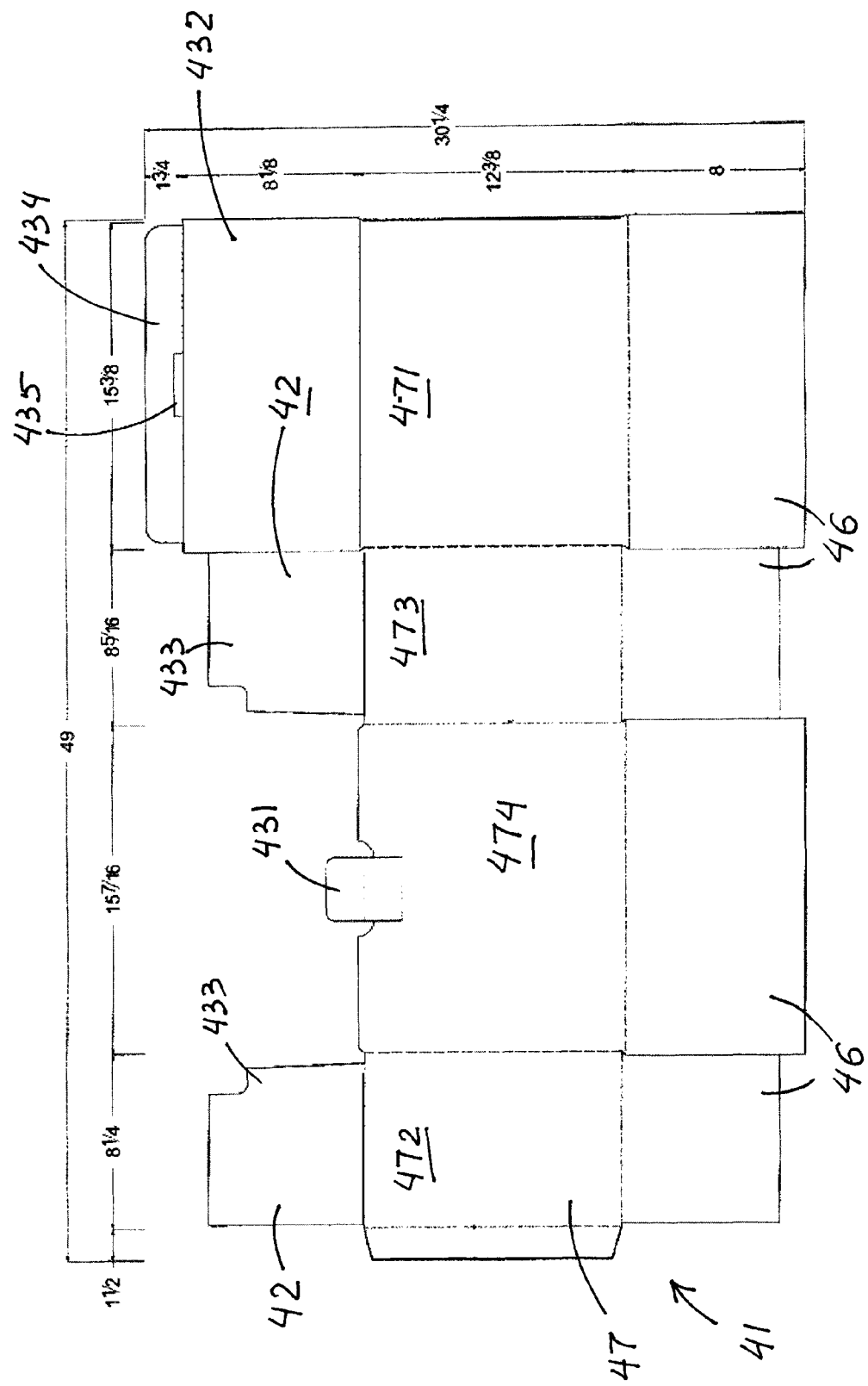
FIG. 5 is a plan view of a sheet material cut for an outer container.

FIG. 5 illustrates a sheet of material which is cut for outer-container surrounding wall 41 and which is folded and erected into a rectangular box 45 forming outer container 40. It is seen in FIG. 5 that outer-container surrounding wall 41 includes an outer-container bottomwall 46 and an outer-container sidewall 47 which extendes from outer-container bottomwall 46 with outer-container topwall 42 being connected to outer-container sidewall 47.

FIGS. 1-5 show that closures 23, 43 and 32 of inner, outer and intermediate containers 20, 40 and 30, respectively, are re-closeable and adhesive-free permitting repeated opening and closing of the leak-proof package.

As seen in FIGS. 1-4, inner-container closure 23 is formed by overlapping inner-container topwall flaps 221 each extending from a corresponding portion 281 of inner-container sidewall 28. FIGS. 1-3 and 5 show that outer-container closure 43 includes a locking tab 431 and a major flap 432. FIG. 5 shows locking tab 431 integral with and extends from outer-container sidewall 47. It is further seen in FIG. 5 that major flap 432 extends from a first portion 471 of outer-container sidewall 47. To lock packaging 10, major flap 432 overlaps a pair of minor flaps 433, each of which extends from one of second and third portions 472 and 473 of outer-container sidewall 47, into position adjacent to a fourth portion 474. FIG. 5 also shows that major flap 432 terminates with a transverse interior flange 434 which defines an aperture 435 therethrough. As further seen in FIGS. 1-3 and 5, locking tab 431 extends from fourth portion 474 of outer-container sidewall 47 opposite first outer-sidewall portion 471. In locked position, locking tab 431 extends through flange aperture 435 to hold flange 434 against an interior surface 48 of fourth outer-sidewall portion 474.

FIGS. 2 and 3 illustrate packaging 10 including a fluid-impermeable innermost container 50 which is configured to seal battery 11 therewithin. In FIG. 4, innermost container 50 is shown with a top end 51 forming a fluid-impermeable lock 52. FIGS. 2 and 3 shows innermost container 50 as a plastic bag 500. In FIG. 3, fluid-impermeable lock 52 is shown to include an interlocking groove 53 and ridge 54 that form a fluid-tight seal when engaged together Innermost-container bag 500 may be made according to the same specifications as intermediate-container bag 300 and vary only in size.

Figure 7:
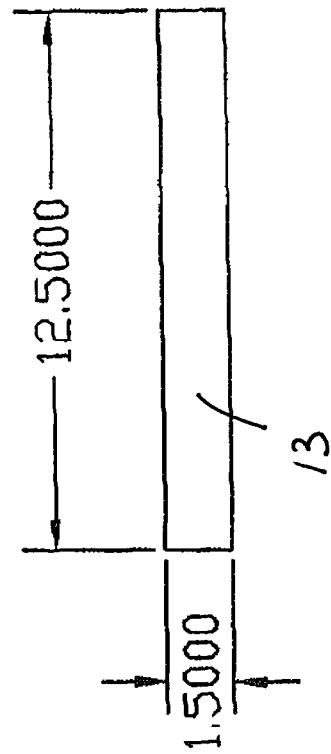
FIG. 7 is a side plan view of the inner spacer of FIG. 6 and showing an exemplary thickness of the inner spacer.
Figure 6:
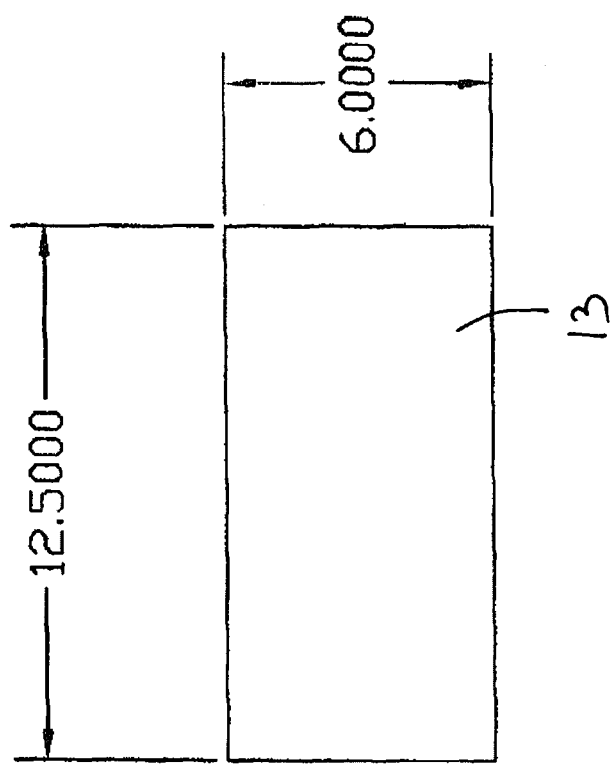
FIG. 6 is a top plan view of an inner spacer and showing exemplary length and width of the inner spacer.

It is further seen in FIGS. 1-3 that package 10 further includes an inner spacer 13 for positioning over battery to limit movement of battery 11. Inner spacer 13 is preferably of a cushioning material such as corrugated cardboard or acid-resistant corrugated plastic. FIGS. 6 and 7 illustrate exemplary dimensions of spacer 13. The corrugation cells may form about 0.75 inch openings.

Figures 8, 9:
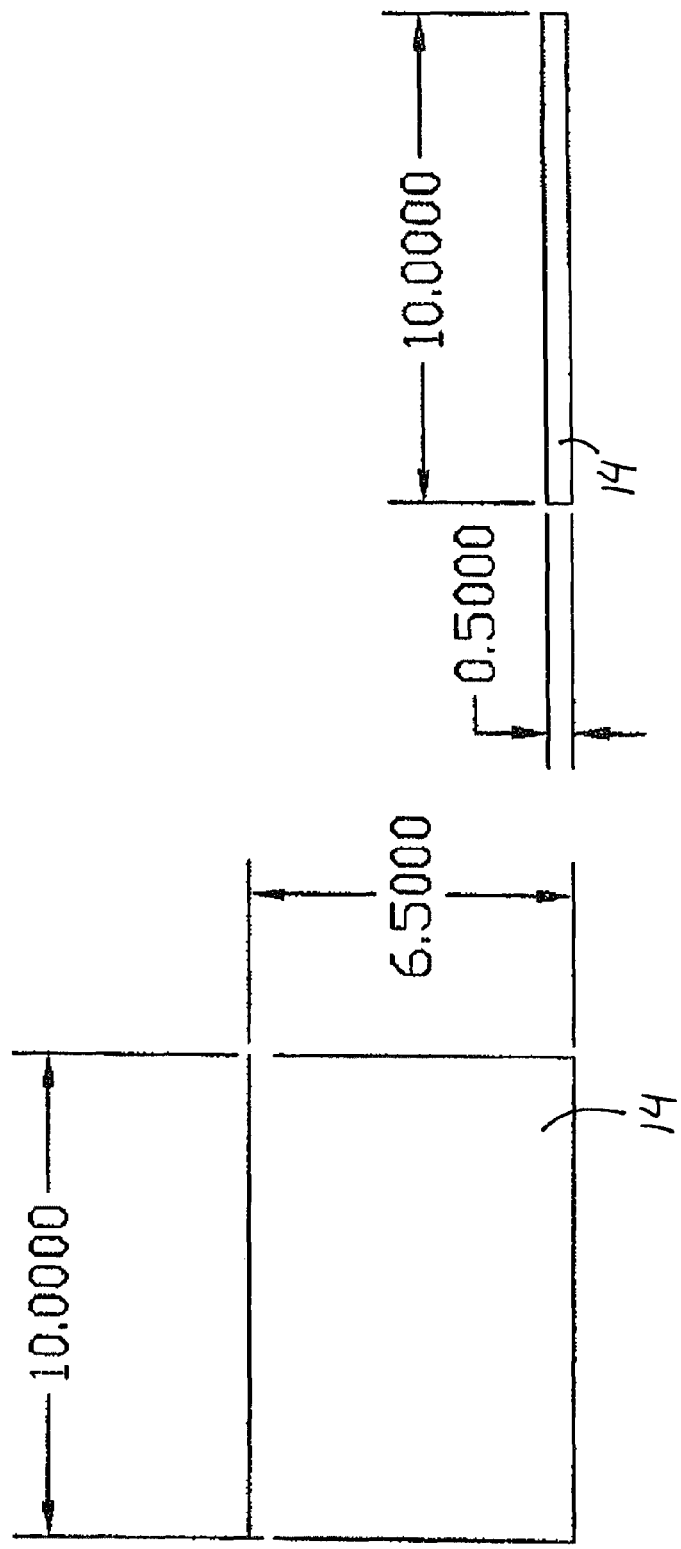
FIG. 8 is a top plan view of a buffer and showing exemplary length and width of the buffer.
FIG. 9 is a side plan view of the buffer of FIG. 8 and showing an exemplary thickness of the buffer.

FIGS. 1-3 also show a pair of buffers 14 for positioning between intermediate container 30 and outer-container surrounding wall 41. Buffers 14 are preferably of a cushioning material such as corrugated cardboard with cells size of about 0.75 inches. FIGS. 8 and 9 illustrate exemplary dimensions of buffers 14.

It should be understood that a larger package 10 that would be suitable for shipping batteries up to about 150 lbs may include additional buffers 14 (honeycomb cardboard cushioning pieces) between inner and outer containers 20 and 40 as well as within inner container 20. Such additional buffers may be placed between inner and outer boxes 27 and 45 on the front, back, top or bottom. Some additional buffers 14 may be positioned inside inner container 20 surrounding battery 11. Such large package 10 may also include additional absorbing pads 12.

Figure 17:
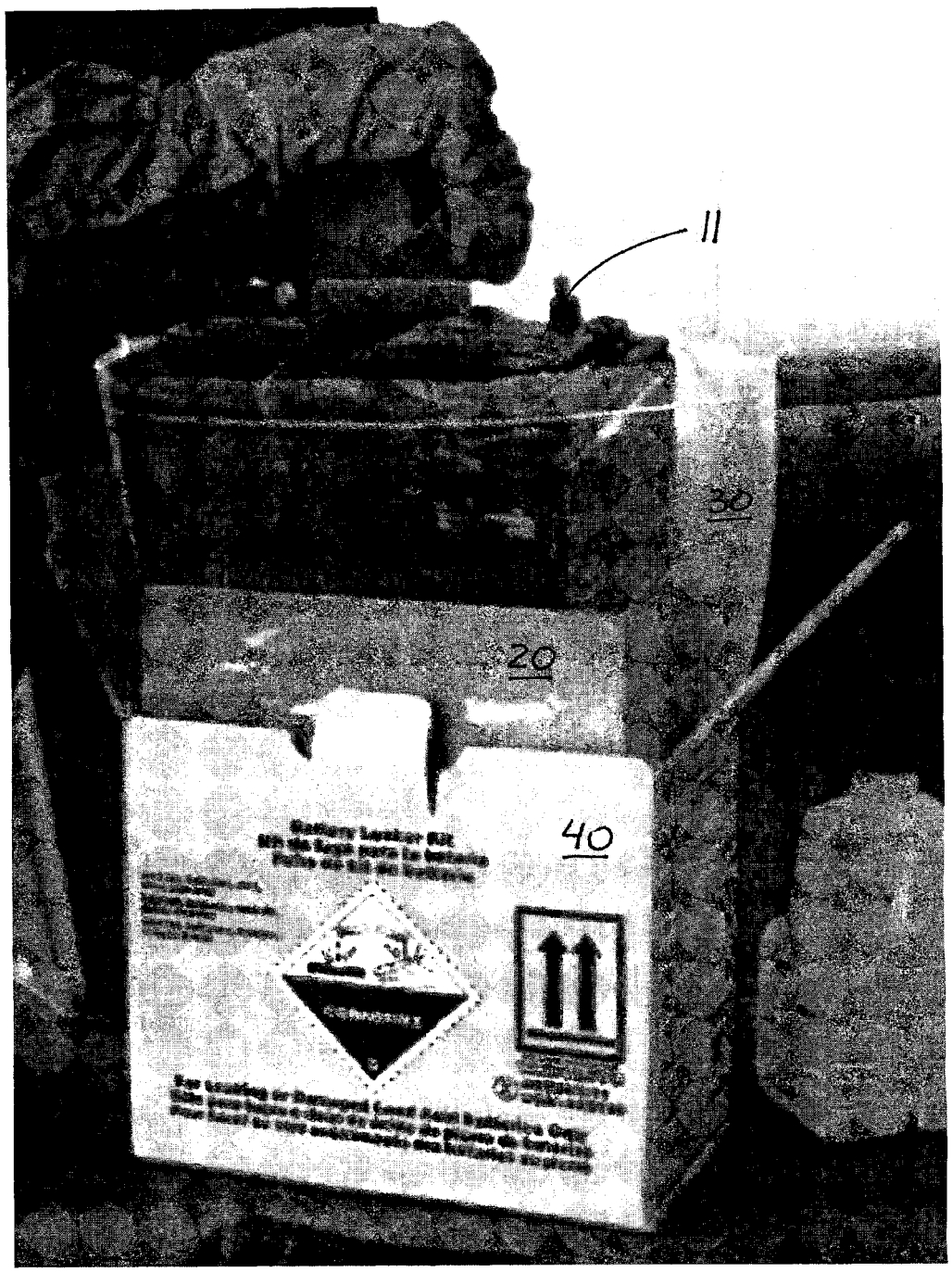
FIG. 17 is an illustration of a user loading the battery into the leak-proof packaging of the present invention.

FIGS. 1-3, 16 and 17 illustrate a method for packaging at least one battery 11 containing corrosive liquid. In such packaging, inner container 20 is enveloped with fluid-impermeable intermediate container 30 which has fluid-impermeable lock 32 at its top end 31. Packaging 10 is then further assembled by putting intermediate container 30 into outer container 40. FIG. 17 shows how battery 11 is loaded into inner container 20 after inner container 20 is enveloped by intermediate container 30. Access opening 24 of inner container 20 is then closed with battery 11 within inner container 20. After that, fluid-impermeable lock 32 of intermediate container 30 is sealed with inner container 20 being inside intermediate container 30. Packaging 10 of battery 11 is completed by closing and locking access opening 44 of outer container 40 with battery 11 being inside inner container 20 which is sealed inside intermediate container 30 inside locked outer container 40 such that liquid-containing defective battery 11 is protectively packaged for leak-free transportation.

It is seen in FIGS. 1-3, 16 and 17 that an exterior surface 49 of outer container 40 includes instructions for using packaging 10 and cautionary information printed in at least English, Spanish and French. A warning label 15 is provided for placement on exterior surface 49. Warning label 15 is provided separately on adhesive sheet with a peel-off cover one the adhesive. Exterior surface 49 of outer container 40 includes a printed diamond of substantially the same size as label 15, the diamond may include words "EMPTY" which indicate that the packaging does not have any hazardous contents. Instructions for placement of warning label over the diamond may also be printed inside the diamond or included in the general instructions for use of packaging 10. Warning label 15 is printed with information according to applicable codes and rules and is attached to exterior surface 49 of outer container 40 after locking sealed battery inside package 10.

At least one absorbent pad 12 is positioned along inner-container bottomwall 25 before battery 11 is loaded into inner container 20. And, inner spacer 13 is placed over battery 11 to limit battery movement. A plurality of s 14 are inserted inside outer container 40, each buffer 14 being between intermediate container 30 and outer-container surrounding wall 41.

FIGS. 2 and 3 shows that prior to loading battery 11 into inner container 20, battery 11 is inserted into fluid-impermeable innermost container 50. Prior to battery 11 being inserted into innermost container 50 which is placed inside inner container 20. Fluid-impermeable innermost container 50 is sealed with the battery therewithin.

While the principles of the invention have been shown and described in connection with specific embodiments, it is to be understood that such embodiments are by way of example and are not limiting.

The invention claimed is:

1. A leak-proof package for at least one defective battery containing corrosive liquid, comprising:
   a substantially rectangular box forming an inner container configured to accept the at least one battery therewithin and having an inner-container surrounding wall that includes a bottomwall, a topwall and a sidewall between the bottomwall and the topwall, the topwall forming an inner-container closure of an inner-container access opening, the inner container being substantially free of pointed corners;
   a plastic bag forming a fluid-impermeable intermediate container sealing the inner container therewithin, the bag having a top end forming a fluid-impermeable lock; and
   an outer container enclosing the intermediate container and having an outer-container surrounding wall that includes an outer-container topwall forming an outer-container closure of an outer-container access opening, whereby the plastic bag is protected from puncture by being between the inner and outer containers such that the defective battery containing corrosive liquid is protectively packaged for leak-free transportation.

2. The package of claim 1 wherein the inner container is of a cushioning material and the outer container is of a substantially stiff material.

3. The package of claim 2 wherein the inner and outer containers are each made of corrugated cardboard.

4. The package of claim 1 wherein the inner container is made of an absorbent material.

5. The package of claim 1 further including at least one absorbent pad along the bottomwall of the inner container.

6. The package of claim 1 wherein the inner-container and outer-container closures and the fluid-impermeable intermediate container are re-closeable permitting repeated opening and closing of the leak-proof package.

7. The package of claim 1 wherein the inner container is made of a sheet folded and erected to form the substantially rectangular box.

8. The package of claim 7 wherein the sheet forming the inner container is cut at positions adjacent to the three-way junctions to remove pointed corners, thereby minimizing puncturing of the intermediate plastic bag which envelopes the inner container.

9. The package of claim 7 wherein the inner-container closure is formed by overlapping topwall flaps each extending from a corresponding portion of the sidewall of the inner container.

10. The package of claim 1 wherein the fluid-impermeable lock of the intermediate container has an interlocking groove and ridge forming a fluid-tight seal when engaged together.

11. The package of claim 1 wherein the outer container is made of a sheet folded and erected to form a substantially rectangular box protecting the intermediate container from puncture by external elements, the outer-container surrounding wall including an outer-container bottomwall and an outer-container sidewall extending therefrom, the outer-container topwall being connected to the outer-container sidewall.

12. The package of claim 11 wherein the outer-container closure is formed by:
a major flap which extends from a first portion of the outer-container sidewall, overlaps a pair of minor flaps each extending from one of second and third portions of the outer-container sidewall and adjacent to the first portion, and terminates with a transverse interior flange defining an aperture therethrough; and
a locking tab extending from a fourth portion of the outer-container sidewall opposite the first outer-sidewall portion and through the flange aperture to hold the flange against an interior surface of the fourth outer-sidewall portion.

13. The package of claim 1 further including a fluid-impermeable innermost container within the inner container, the innermost container being configured to seal the at least one battery therewithin.

14. The package of claim 13 wherein the innermost container is a plastic bag having a top end forming a fluid-impermeable lock which includes an interlocking groove and ridge that form a fluid-tight seal when engaged together.

15. The package of claim 1 further including an inner spacer for positioning over the at least one battery to limit battery movement.

16. The package of claim 15 wherein the inner spacer is of a cushioning material.

17. The package of claim 1 further including a plurality of buffers positioned between the intermediate container and the outer-container surrounding wall.

18. A method for packaging at least one battery containing corrosive liquid, the method comprising:
providing a substantially rectangular box forming an inner container configured to accept the at least one battery therewithin and having an inner-container surrounding wall that includes a bottomwall, a topwall and a sidewall between the bottomwall and the topwall, the topwall forming an inner-container closure of an inner-container access opening, the inner container being substantially free of pointed corners;
enveloping the inner container with a plastic bag forming a fluid-impermeable intermediate container having a top end forming a fluid-impermeable lock;
putting the intermediate container into an outer container formed by an outer-container surrounding wall including an outer-container topwall forming an outer-container closure of an outer-container access opening;
loading the at least one battery into the inner container;
closing the access opening of the inner container with the at least one battery therewithin;
sealing the fluid-impermeable lock of the intermediate container with the inner container therewithin; and
locking the access opening of the outer container,
whereby the defective battery containing corrosive liquid is protectively packaged for leak-free transportation.

19. The method of claim 18 wherein the loading step is after the enveloping step.

20. The method of claim 19 wherein the loading step is after the putting step.

21. The method of claim 18 wherein the inner-container and outer-container closures and the fluid-impermeable intermediate container are re-closeable permitting repeated opening and closing of the leak-proof package.

22. The method of claim 21 wherein:
the fluid-impermeable lock of the fluid-impermeable intermediate container includes an interlocking groove and ridge; and
the sealing step includes forming a fluid-tight seal by engaging the interlocking groove and ridge,
whereby the inner and outer containers protect the bag from puncture by the at least one battery and external elements, respectively.

23. The method of claim 18 further including the step of positioning at least one absorbent pad along an inner-container bottomwall before the loading step.

24. The method of claim 18 further including the steps of:
providing a fluid-impermeable innermost container within the inner container;
inserting the battery into the innermost container during the loading step; and
sealing the fluid-impermeable innermost container with the at least one battery therewithin.

25. The method of claim 24 wherein:
the innermost container is a plastic bag having a top end forming a fluid-impermeable lock which includes an interlocking groove and ridge; and
the step of sealing the innermost container includes forming a fluid-tight seal by engaging the interlocking groove and ridge.

26. The method of claim 18 further including the step of placing an inner spacer over the at least one battery to limit battery movement.

27. The method of claim 18 further including the step of inserting a plurality of buffers between the intermediate container and the outer surrounding wall.

28. In combination a defective battery and package therefor, the combination comprising:
the defective battery unreliably containing corrosive liquid; and
a leak-proof package containing the defective battery, the package comprising:
a substantially rectangular box forming an inner container configured to accept the defective battery therewithin and having an inner-container surrounding wall that includes a bottomwall, a topwall and a sidewall between the bottomwall and the topwall, the topwall forming an inner-container closure of an inner-container access opening, the inner container being substantially free of pointed corners;
a corrosive-fluid-impermeable intermediate container sealing the inner container therewithin, the intermediate container having a top end forming a fluid-impermeable lock; and
an outer container enclosing the intermediate container and having an outer-container surrounding wall that includes an outer-container topwall forming an outer-container closure of an outer-container access opening,
whereby the defective battery unreliably containing corrosive liquid is protectively packaged for leak-free transportation.

29. The package of claim 28 wherein the inner container is of a cushioning material and the outer container are of a substantially stiff material.

30. The package of claim 29 wherein the inner and outer containers are each made of corrugated cardboard.

31. The package of claim 29 wherein the inner container is made of an absorbent material.

32. The package of claim 31 further including at least one absorbent pad along the bottomwall of the inner container.

33. The package of claim 28 wherein the inner-container and outer-container closures and the fluid-impermeable intermediate container are re-closeable permitting repeated opening and closing of the leak-proof package.

34. The package of claim 28 wherein the inner-container surrounding wall is substantially free of three-way-corner sidewall junctions with the inner-container topwall and with the inner-container bottomwall, thereby minimizing puncturing of the intermediate plastic bag which envelopes the inner container.

35. The package of claim 34 wherein the inner container is made of a sheet folded and erected to form the substantially rectangular box, the sheet being cut at positions adjacent to the three-way junctions to remove pointed corners, thereby minimizing puncturing of the intermediate plastic bag which envelopes the inner container.

36. The package of claim 28 further including a fluid-impermeable innermost container within the inner container, the innermost container being configured to seal the defective battery therewithin.

37. The package of claim 36 wherein the innermost container is a plastic bag having a top end forming a fluid-impermeable lock which includes an interlocking groove and ridge that form a fluid-tight seal when engaged together.

38. In combination a wet battery and package therefor, the combination comprising:
  the wet battery unreliably containing corrosive liquid;
  a leak-proof package containing the defective battery, the package comprising:
    a substantially rectangular box forming an inner container configured to accept the defective battery therewithin and having an inner-container surrounding wall that includes a bottomwall, a topwall and a sidewall between the bottomwall and the topwall, the topwall forming an inner-container closure of an inner-container access opening, the inner container being substantially free of pointed corners;
    a corrosive-fluid-impermeable intermediate container sealing the inner container therewithin, the intermediate container having a top end forming a fluid-impermeable lock; and
    an outer container enclosing the intermediate container and having an outer-container surrounding wall that includes an outer-container topwall forming an outer-container closure of an outer-container access opening,
  whereby the defective battery unreliably containing corrosive liquid is protectively packaged for leak-free transportation.

39. The package of claim 38 wherein the inner-container and outer-container closures and the fluid-impermeable intermediate container are re-closeable permitting repeated opening and closing of the leak-proof package.

40. The package of claim 38 wherein the inner-container surrounding wall is substantially free of three-way-corner sidewall junctions with the inner-container topwall and with the inner-container bottomwall, thereby minimizing puncturing of the intermediate plastic bag which envelopes the inner container.

41. The package of claim 40 wherein the inner container is made of a sheet folded and erected to form the substantially rectangular box, the sheet being cut at positions adjacent to the three-way junctions to remove pointed corners, thereby minimizing puncturing of the intermediate plastic bag which envelopes the inner container.

42. The package of claim 38 further including a fluid-impermeable innermost container within the inner container, the innermost container being configured to seal the defective battery therewithin.

43. The package of claim 42 wherein the innermost container is a plastic bag having a top end forming a fluid-impermeable lock which includes an interlocking groove and ridge that form a fluid-tight seal when engaged together.

* * * * *